(12) United States Patent
Hsu

(10) Patent No.: US 6,900,385 B1
(45) Date of Patent: May 31, 2005

(54) FASTENING BELT FOR QUICKLY WRAPPING ELECTRIC CABLES

(76) Inventor: Huei-Yi Hsu, No. 104-9, Liou-an Block, Chia-Li Tseng, Tainan Hsien (TW)

( * ) Notice: Subject to any disclaimer, the term of this patent is extended or adjusted under 35 U.S.C. 154(b) by 0 days.

(21) Appl. No.: 10/771,382

(22) Filed: Feb. 5, 2004

(51) Int. Cl.[7] ................................. H01B 7/34
(52) U.S. Cl. ........................................ 174/36
(58) Field of Search ............... 174/36, 68.1, 69, 174/70, 71 R, 72 R, 72 A, 72 C; 138/110, 128, 156

(56) References Cited

U.S. PATENT DOCUMENTS

| | | | | |
|---|---|---|---|---|
| 2,896,009 A | * | 7/1959 | Caveney | 174/72 A |
| 3,989,885 A | * | 11/1976 | Penczynski et al. | 174/15.5 |
| 6,080,892 A | * | 6/2000 | Scrivens et al. | 568/428 |
| 6,364,828 B1 | * | 4/2002 | Yeung et al. | 600/142 |
| 6,423,898 B1 | * | 7/2002 | Croker | 174/50 |
| 6,429,378 B2 | * | 8/2002 | Shak | 174/135 |
| 6,653,568 B1 | * | 11/2003 | Davis | 174/68.3 |
| 6,688,776 B2 | * | 2/2004 | Simmons et al. | 385/53 |
| 6,774,312 B2 | * | 8/2004 | Fatato | 174/102 D |

FOREIGN PATENT DOCUMENTS

| | | | | |
|---|---|---|---|---|
| DE | 11 00 695 A1 | * | 7/1994 | H02G/3/04 |
| EP | WO 93/18565 | * | 9/1993 | H02G/3/04 |

* cited by examiner

*Primary Examiner*—William H. Mayo, III
(74) *Attorney, Agent, or Firm*—Rosenberg, Klein & Lee

(57) ABSTRACT

A fastening belt for wrapping electric cables is an elongate belt which is used to wrap a bundle of electric cables. The belt includes a plurality of slots defined therethrough and each slot includes an operation section which is offset from the slot so as to define a bending portion which can be bent outward from the belt. The cable can be extended through a hole defined by bending the bending portion.

5 Claims, 9 Drawing Sheets

FASTENING BELT FOR QUICKLY WRAPPING ELECTRIC CABLES

FIELD OF THE INVENTION

The present invention relates to a fastening belt for quickly wrapping electric cables and includes several portions which are split from the belt so that cables can be extended therethrough when needed.

BACKGROUND OF THE INVENTION

A conventional fastening belt 2 is disclosed in FIGS. 8 and 9, and generally is an elongate rectangular plastic plate 21 which includes several protrusions 211 extending from two sides of the belt 2 and several slots 212 are defined through the belt 2 and transversely located between the two sides of the belt 2. The belt 2 is rolled by rolling the two sides of the belt 2 toward with each other so as to wrap a bundle of electric cables. This belt 2 is easily to use to collect the electric cables together so that they will not tangle the people during a working site. When one of the cables is needed to pull out from the belt 2, the user simply pulls the desired cable through the slot 212. Nevertheless, the width of the slots 212 is slightly smaller than the diameter of the cable so that the cable is difficult to be pulled out through the slot 212. Generally, the user will cut the slot 212 to be wider for allowing the cable to go through. This takes time and cracks are resulted in the belt 2 which tends to be torn off if applied by a force. The conventional fastening belt 2 is often complained for its inconvenience.

The present invention intends to provide fastening belt wherein each slot includes an operation section that is not located at an axis of the slot, and the portion defined by the operation section can be bent to form a large hole for the electric cable to be extended therethrough.

SUMMARY OF THE INVENTION

The present invention relates to a fastening belt for wrapping electric cables and comprises an elongate belt having a plurality of protrusions extending from each of two sides thereof and a plurality of slots defined through the belt. Each slot includes an operation section which is offset from the slot. A bending portion defined by the curve section is able to be bent outward from the belt.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
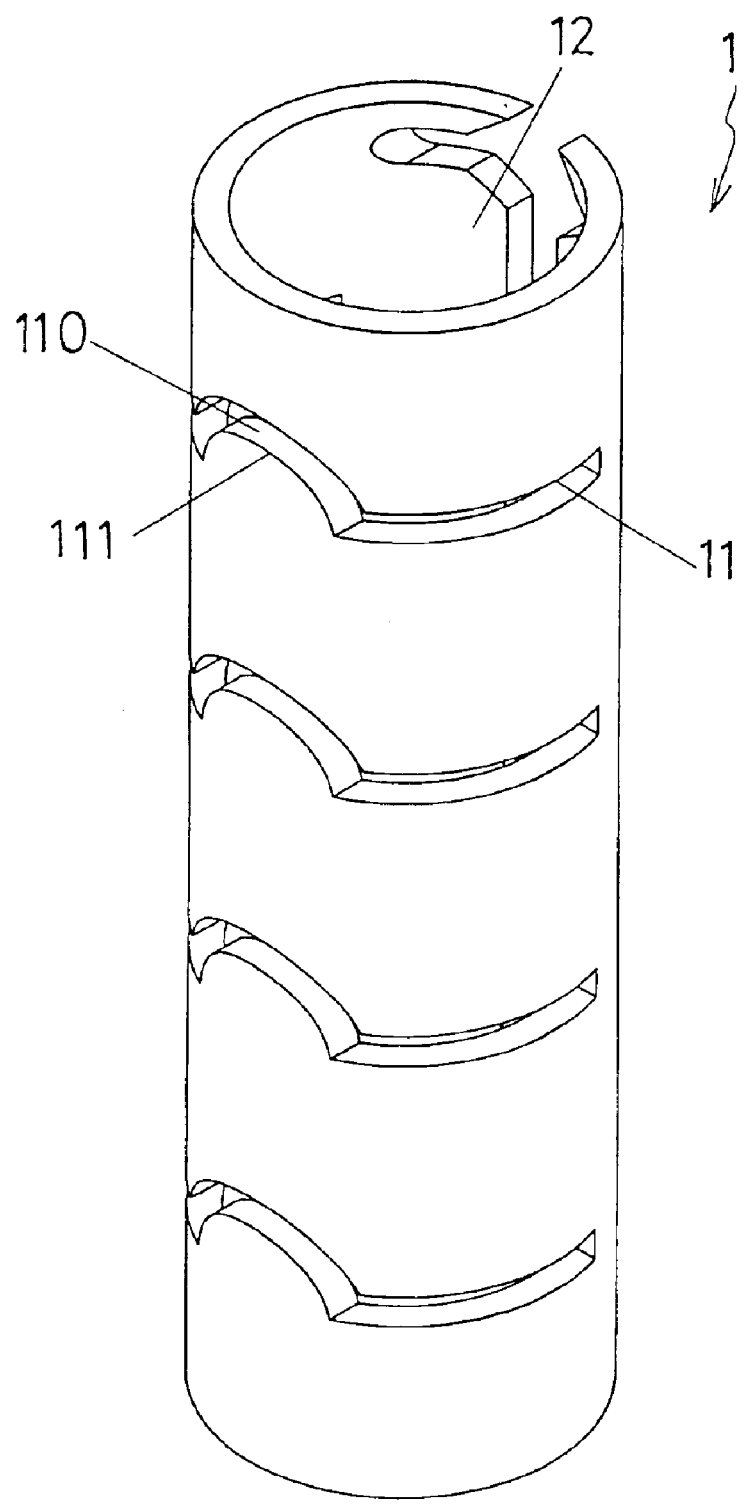
FIG. 1 is a perspective view to show the fastening belt to be circled as a tubular form.
Figure 2:
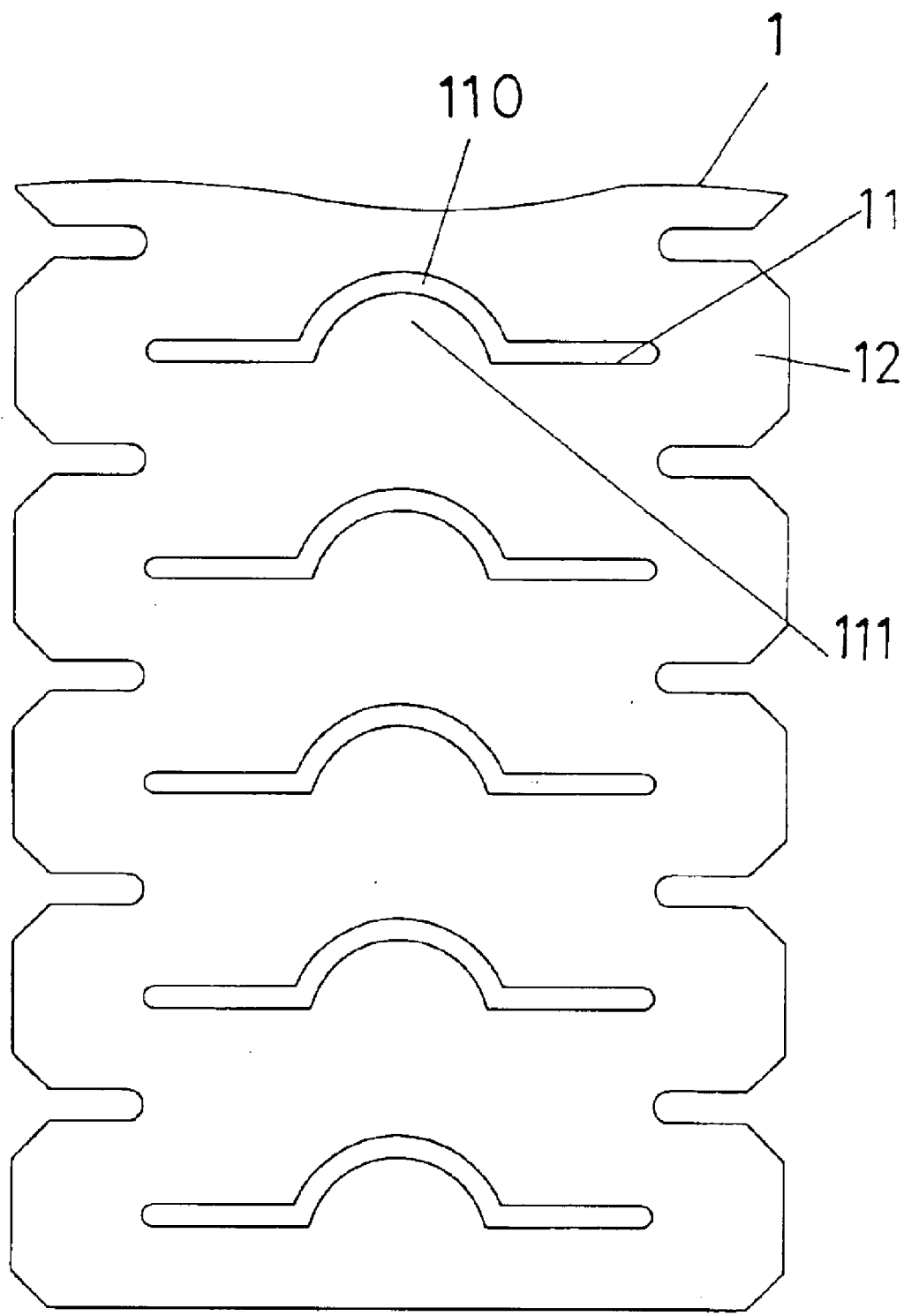
FIG. 2 shows the plate of the present invention.
Figure 3:
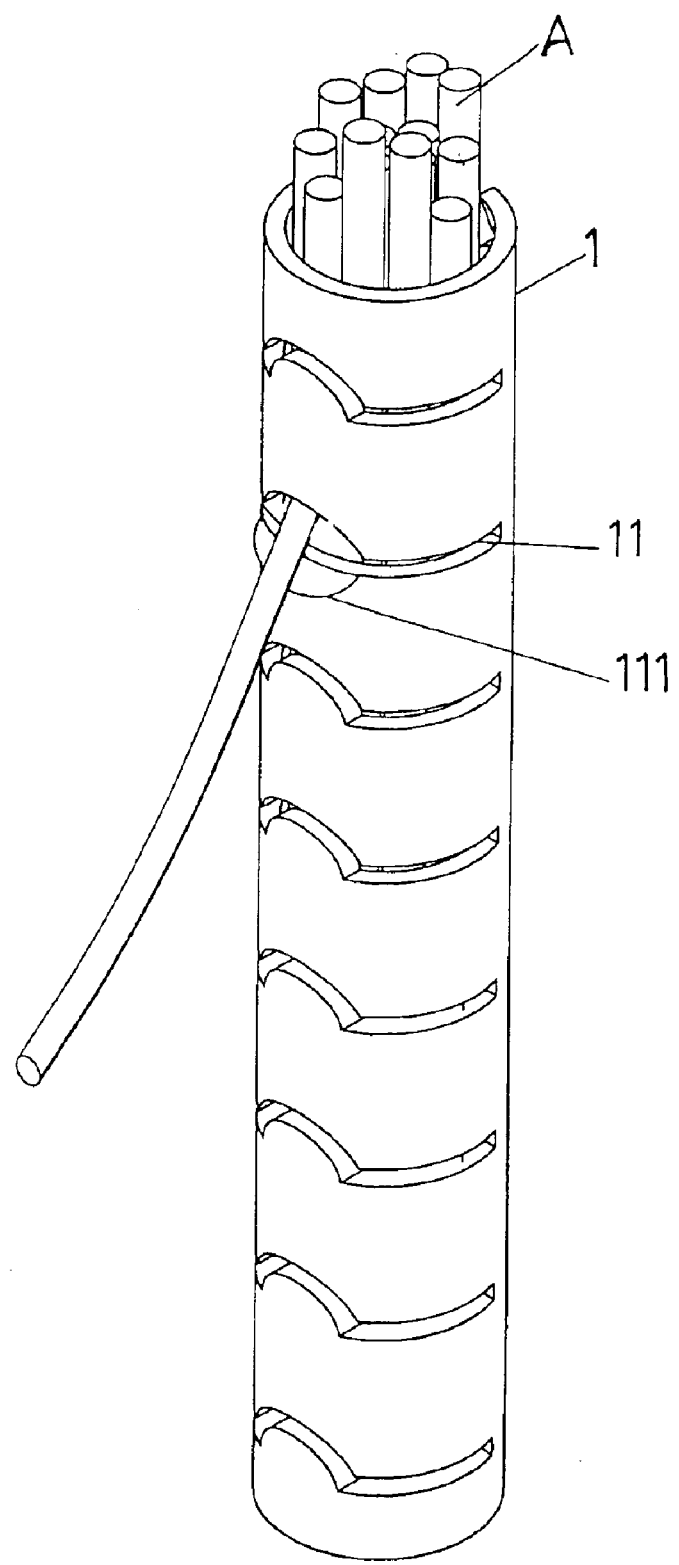
FIG. 3 shows a cable is extended through a hole by bending the bending portion of the belt.
Figure 4:
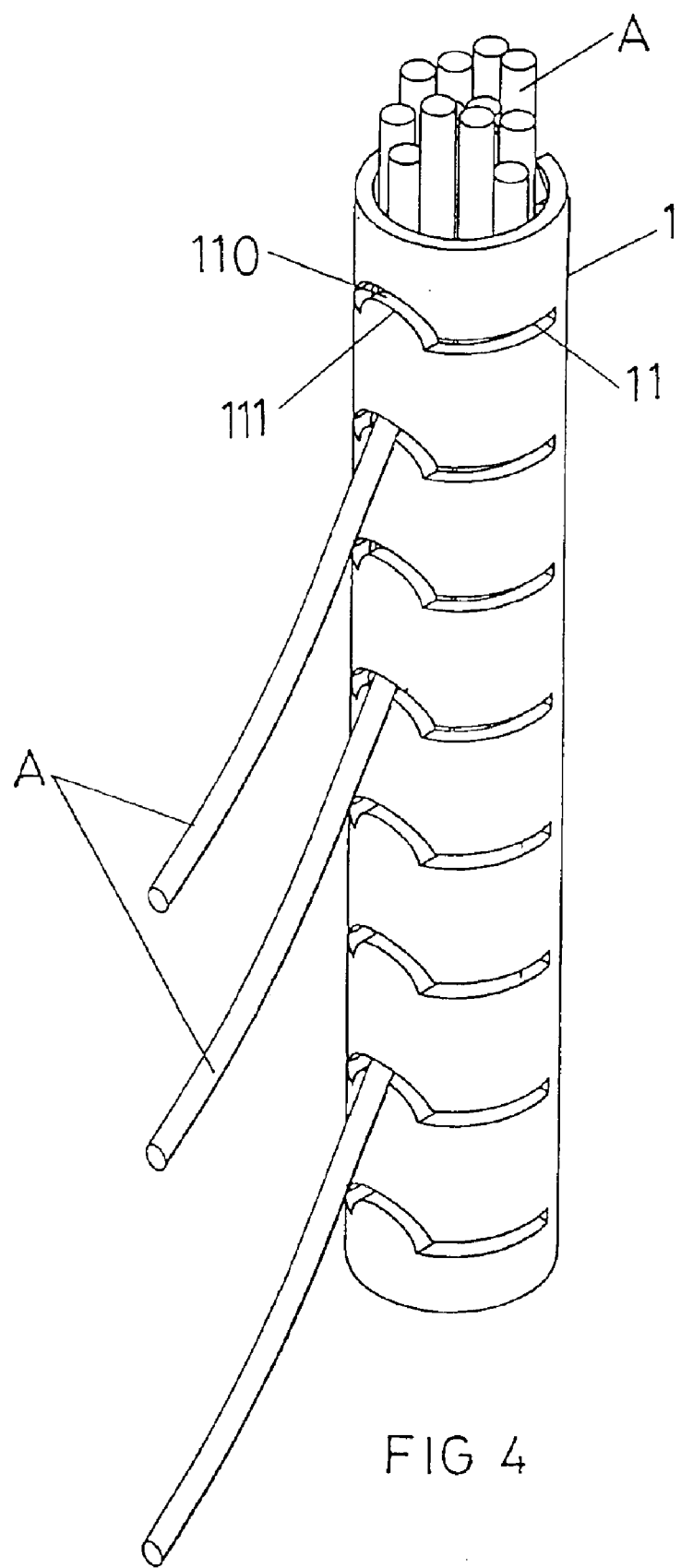
FIG. 4 shows several bending portions are bent back after the cables are extended.

Referring to FIGS. 1 to 3, the fastening belt 1 for wrapping electric cables "A" of the present invention is an elongate belt 1 which is made of flexible material and has a plurality of protrusions 12 extending from each of two sides of the belt 1. A plurality of slots 11 are transversely defined through the belt 1 and located between the two sides of the belt 1. Each slot 11 includes an operation section 110 which is not located at an axis of the slot 11 and is offset from the slot 11. A bending portion 111 is defined by the operation section 110 and can be bent outward from the belt 1. The belt 1 is easily to roll as a tubular form and the electric cables "A" are then wrapped by the belt 1. When one of the cables "A" is needed to pull out from the belt 1, the user bends the bending portion 111 from the belt 1 so as to have a large hole through which the cable "A" can be easily extended therethrough. As shown in FIG. 4, multiple cables "A" can be extended from different holes by the bending portions 111 and when the cables "A" are extended from the holes, the bending portions 111 can be bent back to position the cables "A". The bending portions 111 may also bounce back by its elastic nature.

Figure 5:
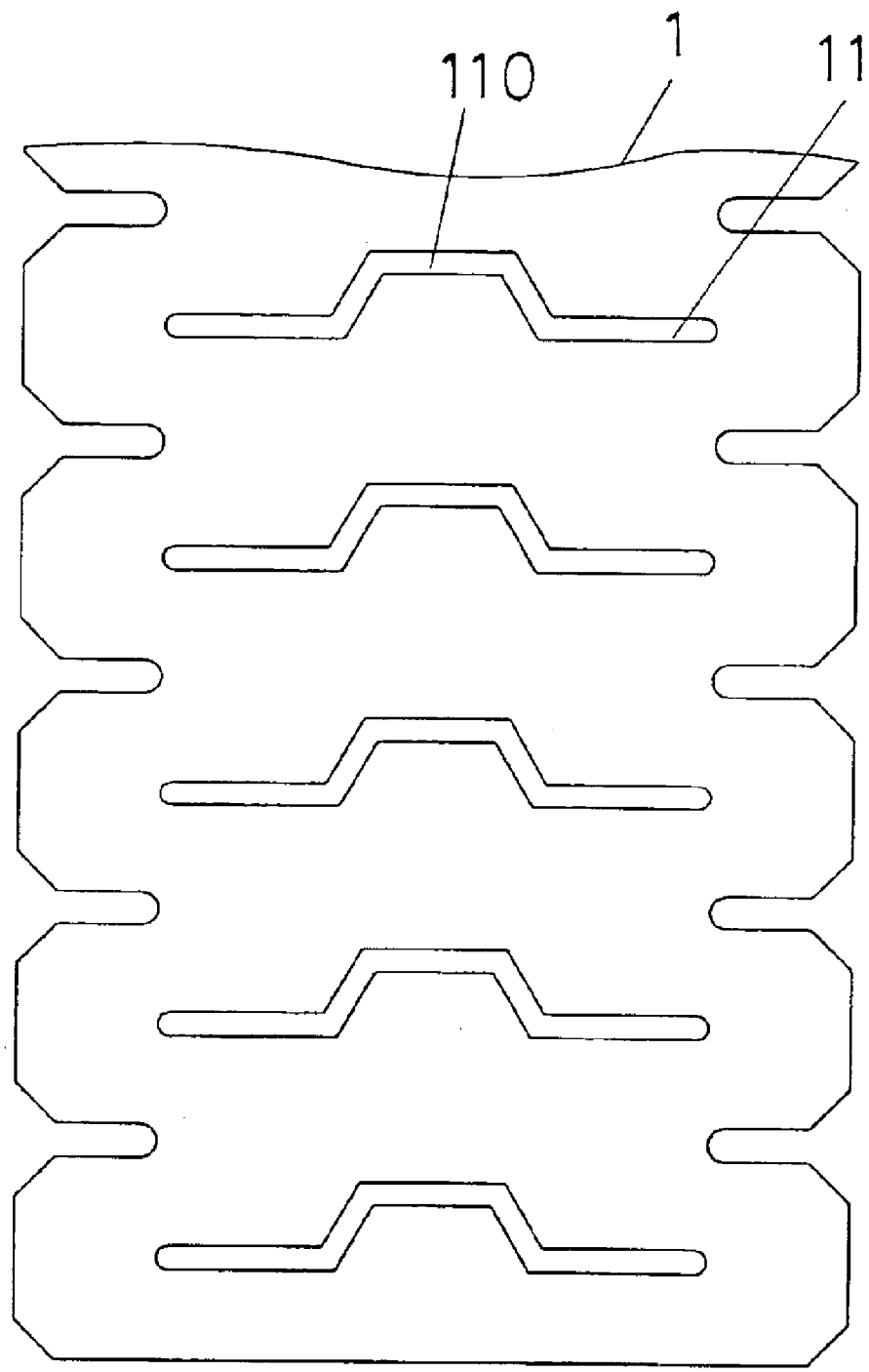
FIGS. 5 to 7 show different shapes of the bending portions of the belt.
Figure 6:
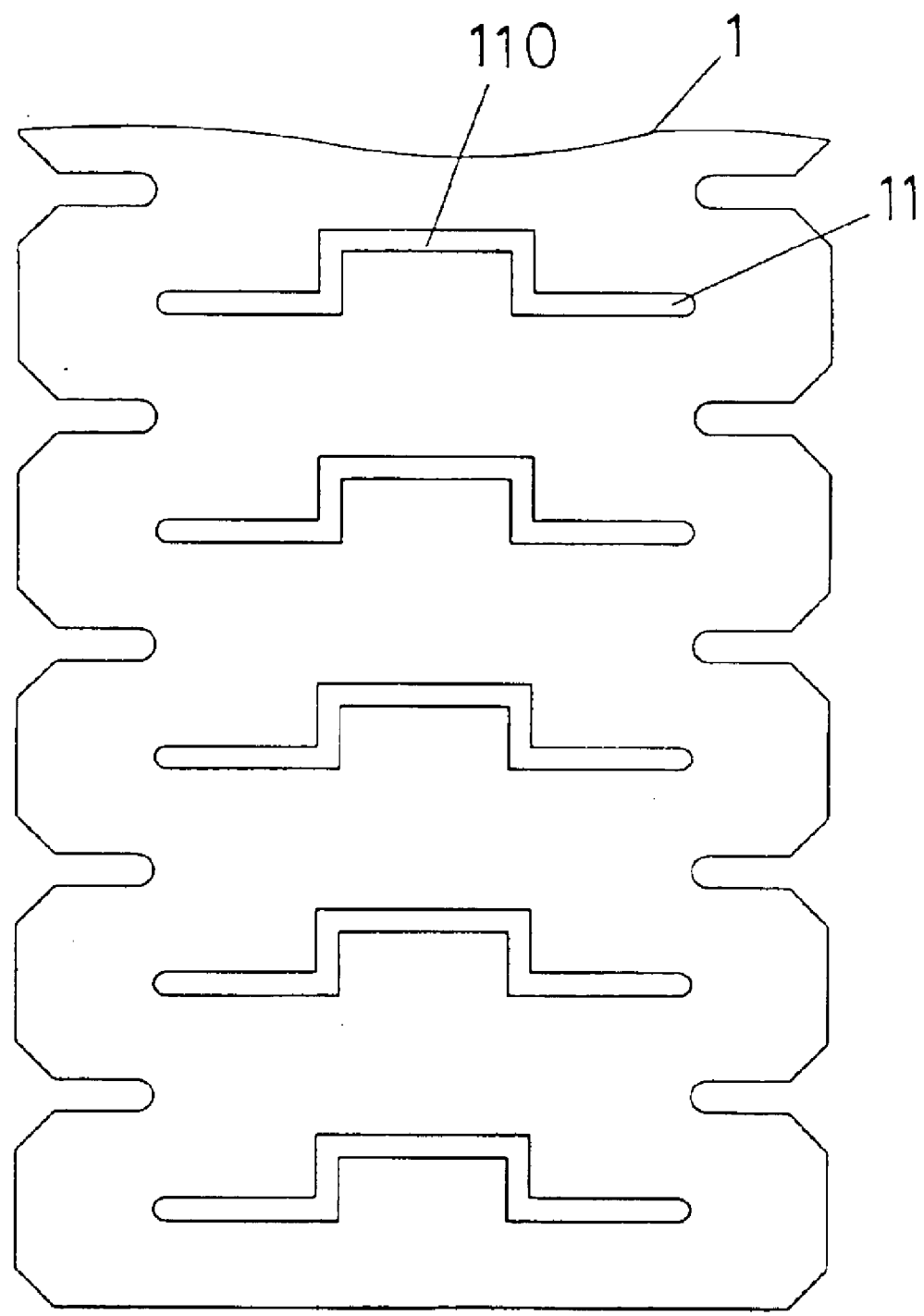
Figure 7:
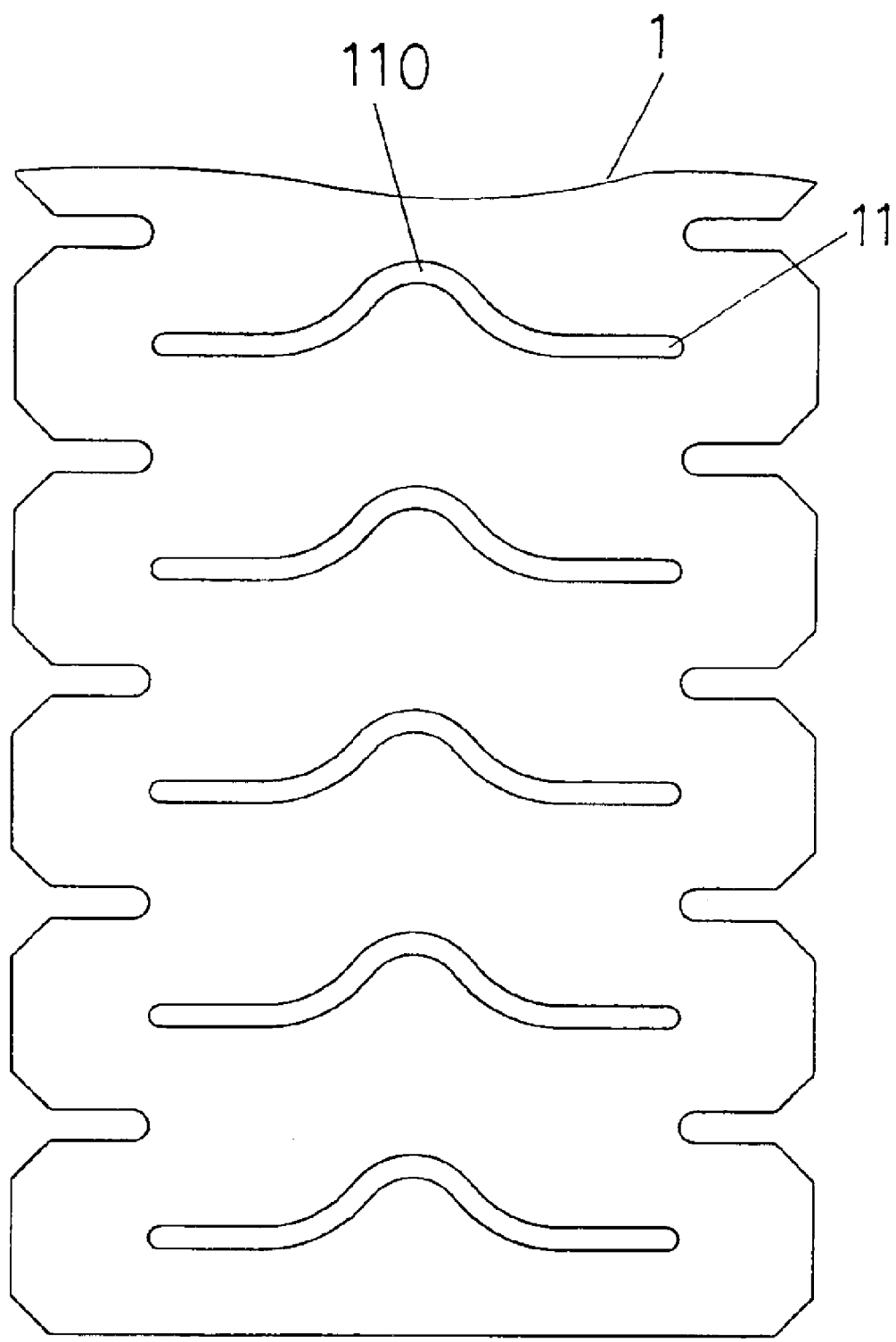
Figure 8:
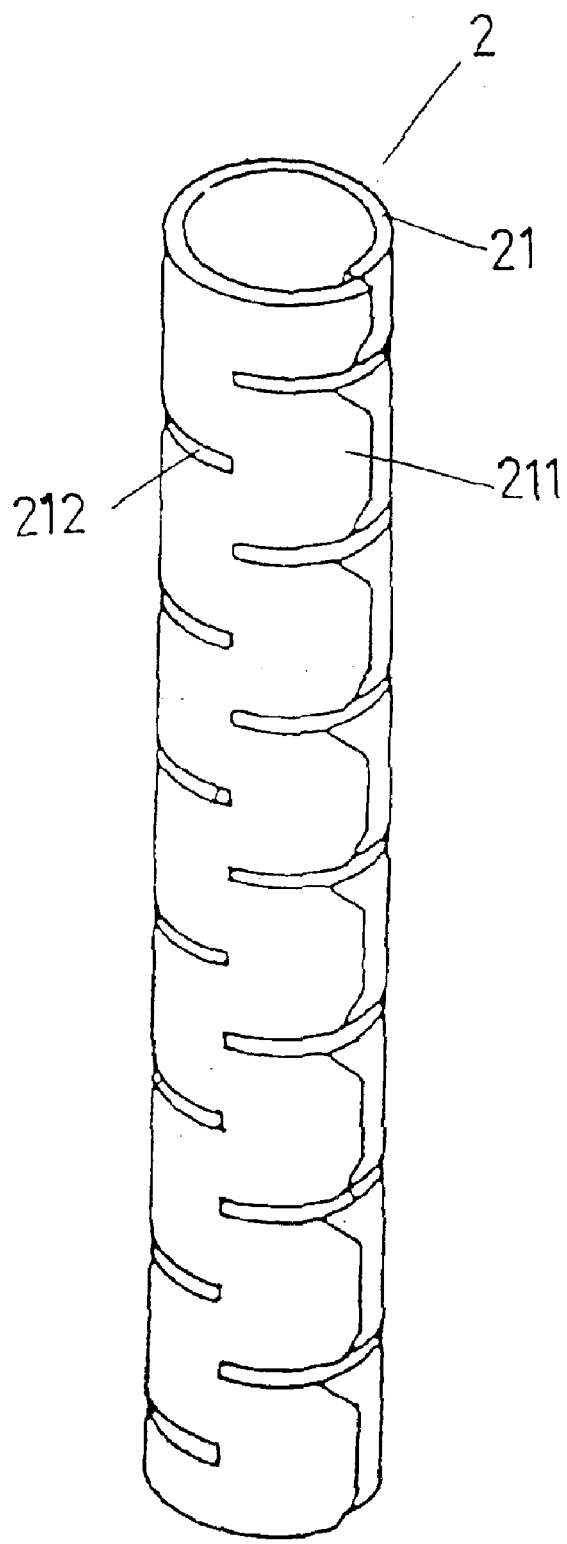
FIG. 8 is a perspective view to show a conventional fastening belt to be circled as a tubular form.
Figure 9:
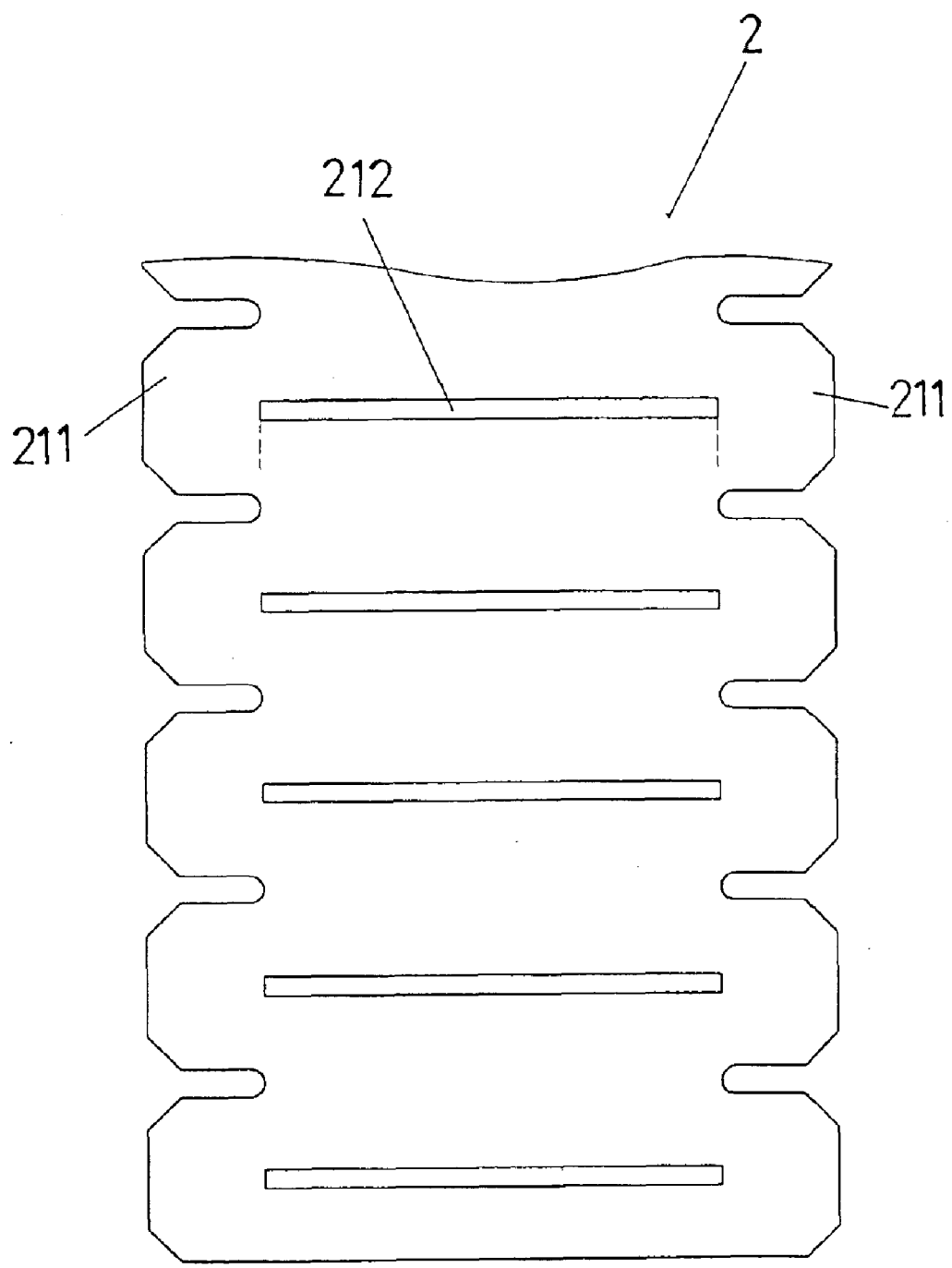
FIG. 9 shows the plate of the conventional fastening belt

FIGS. 5 to 7 show that the bending portions 111 each are in a form of a trapezoid plate, a rectangular plate and a rounded convex plate.

The fastening belt 1 of the present invention do not need the user to cut to obtain large enough holes for the cables extending therethrough, and the bending portions 111 can be bent or bounce backward to clamp the cables "A". This important feature effectively improves the shortcomings of the conventional fastening belt 1.

While we have shown and described the embodiment in accordance with the present invention, it should be clear to those skilled in the art that further embodiments may be made without departing from the scope of the present invention.

What is claimed is:

1. A fastening belt for wrapping electric cables, comprising:

an elongate belt having a plurality of protrusions extending from each of two sides of the belt, a plurality of slots defined through the belt and each of said plurality of slots including an operation section, each operation section being positioned offset from the slot corresponding thereto and being positioned central to said slot each of said slots and each corresponding operation section being positioned symmetrically about a central axis, and each of said plurality of slots being vertically aligned with adjacent ones of said plurality of slots; and, a plurality of bending portions being defined by the operation section of each of the slots and being bent outward from the belt.

2. The belt as claimed in claim 1, wherein the slots are transversely located between the two sides of the belt.

3. The belt as claimed in claim 1, wherein each of said plurality of bending portions is in the form of a rectangular plate.

4. The belt as claimed in claim 1, wherein each of said plurality of bending portions is in the form of a trapezoidal plate.

5. The belt as claimed in claim 1, wherein each of said operation sections has an arcuate contour and is in open communication with a pair of opposed end sections of a corresponding one of said slots.

* * * * *